United States Patent
Keegan et al.

(10) Patent No.: US 11,701,730 B2
(45) Date of Patent: Jul. 18, 2023

(54) NICKEL-CONTAINING STICK ELECTRODE

(71) Applicant: Postle Industries, Inc., Cleveland, OH (US)

(72) Inventors: James Keegan, Cleveland, OH (US); Christopher Postle, Cleveland, OH (US)

(73) Assignee: POSTLE INDUSTRIES, INC., Cleveland, OH (US)

( * ) Notice: Subject to any disclaimer, the term of this patent is extended or adjusted under 35 U.S.C. 154(b) by 636 days.

(21) Appl. No.: 16/737,031

(22) Filed: Jan. 8, 2020

(65) Prior Publication Data
US 2020/0223007 A1 Jul. 16, 2020

Related U.S. Application Data

(60) Provisional application No. 62/792,649, filed on Jan. 15, 2019.

(51) Int. Cl.
| | |
|---|---|
| *B23K 9/173* | (2006.01) |
| *B23K 9/02* | (2006.01) |
| *B23K 9/133* | (2006.01) |
| *B23K 9/16* | (2006.01) |
| *B23K 35/30* | (2006.01) |

(52) U.S. Cl.
CPC ............. *B23K 9/173* (2013.01); *B23K 9/02* (2013.01); *B23K 9/133* (2013.01); *B23K 9/16* (2013.01); *B23K 35/3033* (2013.01); *B23K 35/3066* (2013.01)

(58) Field of Classification Search
CPC ............ B23K 35/0261; B23K 35/3033; B23K 35/3053; B23K 35/3066; B23K 9/02; B23K 9/133; B23K 9/16; B23K 9/173
See application file for complete search history.

(56) References Cited

U.S. PATENT DOCUMENTS

| | | | | |
|---|---|---|---|---|
| 3,431,091 A | * | 3/1969 | Soulary | B23K 35/3053 |
| | | | | 428/925 |
| 4,800,131 A | * | 1/1989 | Marshall | B23K 35/3066 |
| | | | | 428/548 |
| 8,563,897 B2 | | 10/2013 | Duncan et al. | |
| 2015/0076130 A1 | * | 3/2015 | Zhang | B23K 9/173 |
| | | | | 219/137 R |
| 2020/0171595 A1 | * | 6/2020 | Amata | B23K 35/36 |

FOREIGN PATENT DOCUMENTS

| | | | | |
|---|---|---|---|---|
| CA | 2926569 A1 | * | 5/2015 | ......... B23K 35/0244 |
| GB | 1045651 | | 10/1966 | |
| JP | 103281090 | | 12/1991 | |

OTHER PUBLICATIONS

European Search Authority, Search Report and Written Opinion for corresponding EP application No. 20151282.9 (dated Mar. 18, 2020).

* cited by examiner

*Primary Examiner* — Brian W Jennison
*Assistant Examiner* — Abigail H Rhue
(74) *Attorney, Agent, or Firm* — Ulmer & Berne LLP; Brian E Turung (57) ABSTRACT

A metal-cored electrode for welding to form a weld bead on a ferrous material, which weld bead includes at least 35 wt. % nickel. The metal-cored electrode includes a metal sheath surrounding a core. The core includes greater than 35 wt. % nickel.

13 Claims, 2 Drawing Sheets

NICKEL-CONTAINING STICK ELECTRODE

The present disclosure claims priority on U.S. Provisional Application Ser. No. 62/792,649 filed Jan. 15, 2019, which is incorporated herein by reference.

BACKGROUND

The present disclosure relates to metal welding and finds particular application in conjunction with nickel-containing electrodes and will be described with particular reference thereto. However, it is to be appreciated that the present exemplary embodiment is also amenable to other like applications.

In the field of arc welding, the three main types of arc welding are submerged arc welding (SAW), shielded metal arc welding (SMAW), and flux-cored arc welding (FCAW). In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux and form a subsurface conductive pool which is kept fluid by the continuous flow of current. The end of the electrode and the workpiece directly below it become molten and molten filler metal is deposited from the electrode onto the work. The molten filler metal displaces the flux pool and forms the weld. In shielded metal arc welding, shielding is by a flux coating on the sheath instead of a loose granular blanket of flux. The consumable electrode is generally shaped as an elongated cylinder (stick) and, as such, the welding process is often referred to as "stick welding." The electrode can be a solid wire rod or a metal sheath that surrounds the core and wherein the core includes fluxing agents and/or alloying agents. The composition of the electrode is generally chosen based on many factors, but primarily the electrode is chosen to have a similar composition of the target workpiece or the target weld bead composition. A flux is generally coated on the outer surface of the sheath. In flux-cored electrodes, the flux is contained within the core of the metal sheath.

Currently, the stick electrodes for forming a weld metal which has a composition of nickel that satisfies AWS A 5.15-90 for ENiFe-CI and ENiFe-CI-A classes are difficult and expensive to produce. These current electrodes are formed of a solid wire of nickel alloy or a nickel-containing sheath that also has a nickel content in the core of no more than 15 wt. %. The solid nickel wires are used in continuous arc welding processes and are not designed for use in stick welding operations. The electrodes formed of a nickel-containing sheath that also have a nickel content in the core are expensive to manufacture due to the high costs and difficulty in obtaining nickel sheets of a desired alloy composition that can be used to form a sheath for a stick electrode.

In view of the current state of the art of consumable electrodes for use in forming a weld bead that satisfies the AWS A 5.15-90 for ENiFe-CI and ENiFe-CI-A classes, there is a need for a less expensive electrode that can be used in both continuous arc welding processes and stick welding operations.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

The present disclosure provides consumable electrodes and welding processes that utilize a high nickel core composition and iron sheath that can be used to form a weld bead that satisfies the AWS A 5.15-90 for ENiFe-CI and ENiFe-CI-A classes. These electrodes can be used in both continuous arc welding processes and stick welding operations. The consumable electrodes in accordance with the present disclosure are formulated to create a weld bead comprising at least 35 wt. % nickel, and typically at least 45 wt. % nickel. The consumable electrodes are generally cylindrical in shape and have a substantially cylindrical electrode core and an iron-containing sheath surrounding the core.

In one non-limiting aspect of the present disclosure, the sheath of the electrode generally constitutes about 12-60 wt. % (and all values and ranges therebetween) of the total weight of the electrode. In one non-limiting embodiment, the sheath constitutes at least 30 wt. % of the total weight of the electrode, and generally the sheath constitutes about 40-55 wt. % of the total weight of the electrode. The composition of the sheath of the electrode generally constitutes at least 50 wt. % iron, and typically at least 75 wt. % iron. In one non-limiting embodiment, the composition of the sheath of the electrode constitutes at least 90 wt. % iron, and typically at least 95 wt. % iron. In one non-limiting configuration, the composition of the sheath of the electrode generally constitutes at least 80 wt. % of the total iron content of the electrode, typically the composition of the sheath of the electrode generally constitutes at least 90 wt. % of the total iron content of the electrode, and more particularly the composition of the sheath of the electrode generally constitutes at least 95 wt. % of the total iron content of the electrode. Generally, the sheath encircles 80-100% of the core.

In another and/or alternative non-limiting aspect of the present disclosure, the composition of the sheath of the electrode generally constitutes less than 5 wt. % nickel. In one non-limiting embodiment, the composition of the sheath of the electrode generally constitutes no more than 2 wt. % nickel, typically no more than 1 wt. %, and more typically no more than 0.25 wt. %. When the composition of the sheath of the electrode includes nickel, the nickel content can be as low as 0.01 wt. % of the sheath. In another non-limiting embodiment, no more than 10 wt. % of the total nickel content of the electrode is located in the composition of the sheath of the electrode. In one non-limiting specific configuration, no more than 5 wt. % of the total nickel content of the electrode is located in the composition of the sheath of the electrode, more particularly no more than 2 wt. % of the total nickel content of the electrode is located in the composition of the sheath of the electrode, and even more particularly no more than 1 wt. % of the total nickel content of the electrode is located in the composition of the sheath of the electrode.

In another and/or alternative non-limiting aspect of the present disclosure, the content of the core of the electrode generally constitutes at least 40 wt. % of the total weight of the electrode, and typically the content of the core constitutes about 45-70 wt. % of the total weight of the electrode. The content of the core of the electrode includes nickel. The nickel is generally in the form of nickel powder; however, the nickel can also or alternatively be in the form of nickel alloy powder, nickel or nickel alloy metal flakes, a nickel or nickel alloy wire, etc. The content of the core of the electrode can optionally include metals other than nickel or nickel alloy such as, but not limited to, metallic and/or non-metallic elements and/or alloys, inorganic compounds, and/or organic compounds. The nickel content in the core that constitutes a high nickel content is at least 35 wt. % of the core. Typically, the nickel content of the core is about 40-100 wt. % of the core (and all values and ranges therebetween). In one non-limiting configuration, the nickel content of the core is greater than 50 wt. % of the core. In one non-limiting specific configuration, at least 80 wt. % of the total nickel content of the electrode is located in the composition of the core of the electrode, typically at least 95 wt. % of the total nickel content of the electrode is located in the composition of the core of the electrode, more typically at least 98 wt. % of the total nickel content of the electrode is located in the composition of the core of the electrode, and even more typically at least 99 wt. % of the total nickel content of the electrode is located in the composition of the core of the electrode.

In another and/or alternative non-limiting aspect of the present disclosure, when the composition of the core of the electrode includes iron, the iron content is generally less than 10 wt. % of the core, typically less than 5 wt. % of the core, and more typically less than 2 wt. % of the core. In another non-limiting embodiment, no more than 10 wt. % of the total iron content of the electrode is located in the composition of the core. In one non-limiting specific configuration, no more than 5 wt. % of the total iron content of the electrode is located in the composition of the core, more particularly no more than 2 wt. % of the total iron content of the electrode is located in the composition of the core, and even more particularly no more than 1 wt. % of the total iron content of the electrode is located in the composition of the core.

In another and/or alternative non-limiting aspect of the present disclosure, the electrode can optionally include a coating. The coating (when used) generally constitutes at least 0.1 wt. % of the total weight of the electrode, and typically about 0.5-18 wt. % of the total weight of the electrode. The coating generally includes a binder and one or more flux agents; however, the coating can include one or more metals or metal alloys to affect the composition of the weld metal. In one non-limiting embodiment, the nickel content in the coating constitutes no more than 10 wt. % of the total nickel content of the electrode, typically the nickel content in the coating constitutes no more than 5 wt. % of the total nickel content of the electrode, more typically the nickel content in the coating constitutes no more than 1 wt. % of the total nickel content of the electrode, and still more typically the nickel content in the coating constitutes no more than 0.1 wt. % of the total nickel content of the electrode. In another non-limiting embodiment, the iron content in the coating constitutes no more than 10 wt. % of the total iron content of the electrode, typically the iron content in the coating constitutes no more than 5 wt. % of the total iron content of the electrode, more typically the iron content in the coating constitutes no more than 1 wt. % of the total iron content of the electrode, and still more typically the iron content in the coating constitutes no more than 0.1 wt. % of the total iron content of the electrode. Generally, the coating encircles 80-100% of the sheath.

Also provided herein are methods for creating a stick electrode having a core with high nickel content. The method includes providing an iron strip, bending the iron strip to form a trough, adding nickel and optionally other ingredients into the trough, further bending the iron strip to form the cored electrode, and optionally cutting the cored electrode to length to form a stick electrode. The outer surface of the cored electrode can optionally be coated with a coating material such as a flux coating or the like.

In one non-limiting object of the present disclosure, there is the provision of a consumable electrode that can be used to form a weld bead that satisfies the AWS A 5.15-90 for ENiFe-CI and ENiFe-CI-A classes.

In another and/or alternative non-limiting object of the present disclosure, there is the provision of a consumable electrode having a larger nickel content in the electrode core and an iron sheath that encircles the core, which consumable electrode can be used to form a weld bead that satisfies the AWS A 5.15-90 for ENiFe-CI and ENiFe-CI-A classes.

In another and/or alternative non-limiting object of the present disclosure, there is the provision of a consumable electrode that can be used in a continuous arc welding processes and/or in stick welding operations.

In another and/or alternative non-limiting object of the present disclosure, there is the provision of a consumable electrode that is formulated to create a weld bead comprising at least 35 wt. % nickel, and typically at least 45 wt. % nickel.

In another and/or alternative non-limiting object of the present disclosure, there is the provision of a consumable electrode that is formed of a sheath that generally constitutes about 12-60 wt. % of the total weight of the electrode.

In another and/or alternative non-limiting object of the present disclosure, there is the provision of a consumable electrode that is formed of a sheath that has a composition that constitutes at least 50 wt. % iron.

In another and/or alternative non-limiting object of the present disclosure, there is the provision of a consumable electrode that is formed of a sheath that has a composition wherein the iron content of the sheath constitutes at least 80 wt. % of the total iron content of the electrode.

In another and/or alternative non-limiting object of the present disclosure, there is the provision of a consumable electrode that is formed of a sheath that encircles 80-100% of the core.

In another and/or alternative non-limiting object of the present disclosure, there is the provision of a consumable electrode that is formed of a sheath that has a composition that constitutes less than 5 wt. % nickel.

In another and/or alternative non-limiting object of the present disclosure, there is the provision of a consumable electrode that is formed of a sheath that has a composition wherein no more than 10 wt. % of the total nickel content of the electrode is located in the sheath.

In another and/or alternative non-limiting object of the present disclosure, there is the provision of a consumable electrode that includes a core that is partially or fully encircled by a sheath wherein the content of the core of the electrode generally constitutes at least 40 wt. % of the total weight of the electrode.

In another and/or alternative non-limiting object of the present disclosure, there is the provision of a consumable electrode that includes a core that is partially or fully encircled by a sheath wherein the content of the core of the electrode includes nickel.

In another and/or alternative non-limiting object of the present disclosure, there is the provision of a consumable electrode that includes a core that is partially or fully encircled by a sheath wherein the nickel in the core is generally in the form of nickel powder.

In another and/or alternative non-limiting object of the present disclosure, there is the provision of a consumable electrode that includes a core that is partially or fully encircled by a sheath wherein the content of the core of the electrode can optionally include metals other than nickel or nickel alloy such as, but not limited to, metallic and/or non-metallic elements and/or alloys, inorganic compounds, and/or organic compounds.

In another and/or alternative non-limiting object of the present disclosure, there is the provision of a consumable electrode that includes a core that is partially or fully encircled by a sheath wherein the nickel content in the core that constitutes at least 35 wt. % of the core.

In another and/or alternative non-limiting object of the present disclosure, there is the provision of a consumable electrode that includes a core that is partially or fully encircled by a sheath wherein the nickel content of the core is greater than 50 wt. % of the core.

In another and/or alternative non-limiting object of the present disclosure, there is the provision of a consumable electrode that includes a core that is partially or fully encircled by a sheath wherein at least 95 wt. % of the total nickel content of the electrode is located in the composition of the core of the electrode.

In another and/or alternative non-limiting object of the present disclosure, there is the provision of a consumable electrode that includes a sheath and wherein an optional coating is at least partially coated on the outer surface of the sheath.

In another and/or alternative non-limiting object of the present disclosure, there is the provision of a consumable electrode that includes a sheath and wherein an optional coating is at least partially coated on the outer surface of the sheath wherein the coating constitutes no more than 18 wt. % of the total weight of the electrode.

In another and/or alternative non-limiting object of the present disclosure, there is the provision of a consumable electrode that includes a sheath and wherein an optional coating is at least partially coated on the outer surface of the sheath wherein the coating includes a binder and one or more flux agents, and optionally one or more metals or metal alloys In another and/or alternative non-limiting object of the present disclosure, there is the provision of a consumable electrode that includes a sheath and wherein an optional coating is at least partially coated on the outer surface of the sheath and the nickel content in the coating constitutes no more than 10 wt. % of the total nickel content of the electrode.

In another and/or alternative non-limiting object of the present disclosure, there is the provision of a consumable electrode that includes a sheath and wherein an optional coating is at least partially coated on the outer surface of the sheath and the iron content in the coating constitutes no more than 10 wt. % of the total iron content of the electrode.

In another and/or alternative non-limiting object of the present disclosure, there is the provision of a consumable electrode that has an outer diameter of no more than 0.75 in.

In another and/or alternative non-limiting object of the present disclosure, there is the provision of a consumable electrode that includes a core that has a core diameter that is no more than 0.5 in.

In another and/or alternative non-limiting object of the present disclosure, there is the provision of a consumable electrode that includes a sheath and wherein an optional coating is at least partially coated on the outer surface of the sheath and the coating thickness of the coating is about 0.01-0.4 in.

In another and/or alternative non-limiting object of the present disclosure, there is the provision of a consumable electrode for welding to form a weld bead on a ferrous material that is formed of at least 80 wt. % iron, and which weld bead includes at least 35 wt. % nickel, the metal-cored electrode comprising a metal sheath surrounding a core, the metal sheath constitutes about 12-60 wt. % of a total weight of the metal-cored electrode, the metal sheath formed of greater than 50 wt. % iron, the core is at least 80% encircled by the metal sheath, the core constitutes 40-70 wt. % of a total weight of the metal-cored electrode, the core includes greater than 35 wt. % nickel.

In another and/or alternative non-limiting object of the present disclosure, there is the provision of a consumable electrode wherein the metal sheath includes at least 75 wt. % iron, and no more than 5 wt. % nickel, a nickel content of the metal sheath constitutes no more than 10 wt. % of a total nickel content of the metal-cored electrode, an iron content of the metal sheath constitutes at least 80 wt. % of a total iron content of the metal-cored electrode.

In another and/or alternative non-limiting object of the present disclosure, there is the provision of a consumable electrode wherein the core includes greater than 50 wt. % nickel, and no more than 5 wt. % iron, an iron content of the core constitutes no more than 10 wt. % of a total iron content of the metal-cored electrode, a nickel content of the core constitutes at least 80 wt. % of a total nickel content of the metal-cored electrode.

In another and/or alternative non-limiting object of the present disclosure, there is the provision of a consumable electrode further including a coating on an outer surface of the metal sheath, the coating constitutes about 0.5-18 wt. % of the total weight of the metal-cored electrode, the coating having a coating thickness of at least 0.01 in., the coating covering at least 80% of an outer surface of the metal sheath, an iron content in the coating is less than 10 wt. % of a total iron content of the metal-cored electrode, a nickel content in the coating is less than 10 wt. % of a total nickel content of the metal-cored electrode.

In another and/or alternative non-limiting object of the present disclosure, there is the provision of a method for forming a weld bead comprising: a) providing metal-cored electrode, said metal-cored electrode comprising a metal sheath surrounding a core, said metal sheath constitutes about 12-60 wt. % of a total weight of said metal-cored electrode, said metal sheath is formed of greater than 50 wt. % iron, said core is at least 80% encircled by said metal sheath, said core constitutes 40-70 wt. % of a total weight of said metal-cored electrode, said core includes greater than 35 wt. % nickel; b) providing a workpiece, said workpiece formed of at least 80 wt. % iron; and, c) heating said metal-cored electrode to at least partially melt said metal-cored electrode and to form a weld bead on said workpiece, said weld bead including at least 35 wt. % nickel.

Other objects, advantages, and novel features of the present invention will become apparent from the following detailed description of the invention when considered in conjunction with the accompanying drawings.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Figure 1:
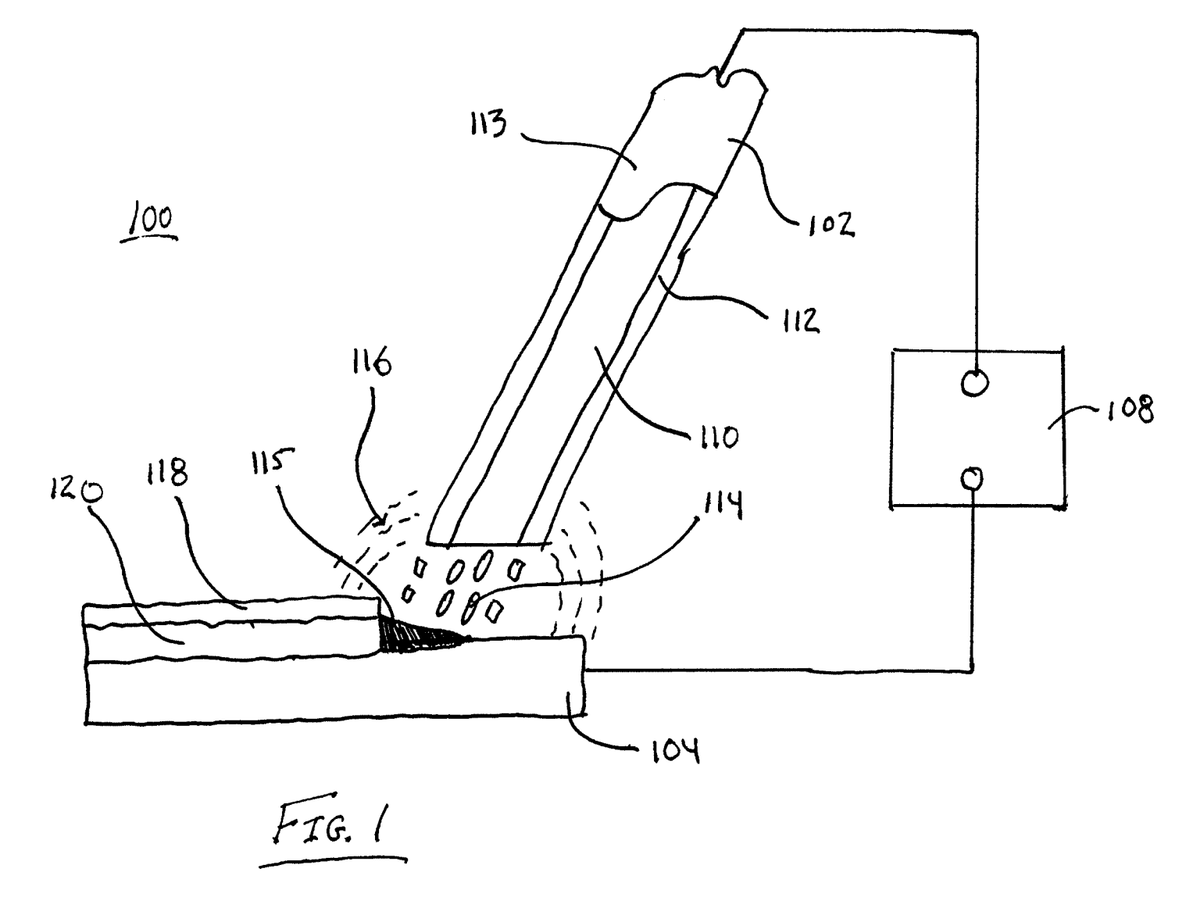
FIG. 1 illustrates a shield metal arc welding system and electrode in accordance with the present disclosure.

In accordance with the present disclosure and with reference to FIG. 1, a welding system 100 is disclosed. The welding system 100 includes an electrode 102 and a workpiece 104, wherein the material of the electrode 102 is deposited on the workpiece 104 in the form of a weld bead 120. An electrical arc is generated between the workpiece 104 and electrode 102 by connection to power supply 108.

The power supply 108 may be an AC or DC power supply generating an arc voltage from about 20 volts to about 30 volts and supply a current from about 30 amps to about 275 amps. As can be appreciated, other voltages and current can be used. When the electrically connected electrode 102 is brought into close proximity to the electrically connected workpiece 104, an electrical arc between the workpiece 104 and electrode 102 is created. The electrical arc generates enough heat to melt a localized portion of the workpiece 104 and a tip portion of the electrode 102 to create a molten weld pool 115 on the workpiece 104. As the electrode is moved about the surface of the workpiece 104, the formed weld pool 115 solidifies, thereby creating a metal deposition/weld bead 120 on workpiece 104.

The melting of electrode 102 results in droplets 114 of material 110 to move from the electrode 102 to the weld pool 115. In some embodiments, such as those including an optional flux coating 113, as the electrode 102 and flux coating 113 are heated, shielding gases 116 are generated and protect the weld pool 115 from chemical reactions with atmospheric elements such as oxygen, which can potentially degrade the resulting weld. The heating of the flux coating can also or alternatively provide molten slag on the weld pool 115. The core 110 of the electrode 102 can optionally include flux agents that provide a shielding gas and/or form a slag during the welding process. The molten slag floats to the top of the weld pool 115 and hardens as a slag layer 118 over the metal deposition 120 to provide protection for the molten weld pool from atmospheric elements until the weld pool hardens.

The electrode 102 is generally in the shape of a cylindrical rod having a substantially cylindrical core 110 and a sheath 112 surrounding the substantially cylindrical core. As can be appreciated, the cross-sectional shape of the core can have a shape other than a circular shape, (e.g., oval, polygonal, etc.). When the electrode 102 includes an optional outer flux coating 113, the flux coating 113 may be provided on the electrode 102 by dipping the sheath 112 in a coating liquid or by some other coating process such as spraying, etc. Upon drying/curing, the flux coating layer 113 forms a coating on 80-100% of the outer surface of the sheath 112.

The electrode 102 generally has an outer diameter from about 0.1875 in. to about 0.75 in. (and all values and ranges therebetween), including but not limited to about 0.25, 0.3125 and 0.375 in.; however, it can be appreciated that the electrode can have other outer diameters. The electrode 102 generally has a core diameter from about 0.085 in. to about 0.5 in. (and all values and ranges therebetween) including, but not limited to, about 0.093, 0.125, 0.156, and 0.087 in.; however, it can be appreciated that the core can have other diameters. The flux coating 113 (when used) generally has a coating thickness of about 0.01-0.4 in. (and all values and ranges therebetween); however, it can be appreciated that the flux coating can have other thicknesses. In one particular non-limiting configuration, the outer diameter of the electrode is not more than 0.4 in., and the core diameter is no more than 0.25 in.

The electrode 102 is formed of a sheath 112 that substantially or fully encircles the core 110. The sheath 112 is generally a strip of a metal material that is bent by a process (e.g., die forming process, etc.) which generates a hollow substantially cylinder shape (i.e., having a donut-like cross-section shape). In some embodiments, the sheath 112 is formed of iron or an iron alloy. When the sheath 112 is formed of an iron alloy, the iron alloy includes one or more elements such as, but not limited to, aluminum, carbon, niobium, antimony, chromium, copper, molybdenum, manganese, N$_2$, nickel, phosphorous, sulfur, silicon, nitrogen, titanium, and vanadium. In some embodiments, the sheath contains less than 2 wt. % nickel, typically less than 1 wt. % nickel, more typically less than 0.5 wt. % nickel, and even more typically less than about 0.1 wt. % nickel. Generally, the iron content of the metal material used to form the sheath 112 is at least 60 wt. %, typically at least 75 wt. %, more typically at least 90 wt. %, even more typically at least 98 wt. %, and yet even more typically at least 99 wt. %. One non-limiting iron material that can be used to form the sheath 112 is 1003 AiSi low carbon steel (e.g., SAE 1003 (UNS G10040)).

The core 110 generally constitutes about 45-70 wt. % of the total weight of the electrode 102 (and all values and ranges therebetween), and typically about 45-65 wt. % of the electrode 102. In accordance with some aspects of the present disclosure, the electrode 102 includes a core 110 that contains at least 45 wt. % nickel. In one non-limiting embodiments, the core 102 is composed of about 50-90 wt. % nickel (and all values and ranges therebetween), including about 60 wt. % nickel, 65 wt. % nickel, 70 wt. % nickel, 75 wt. % nickel, 80 wt. % nickel, and 85 wt. % nickel. In some non-limiting embodiments, the nickel in the core is nickel powder. The core 110 can optionally include additional materials such as, but not limited to, metals or than nickel, metals other than nickel alloys, non-metal elements, inorganic compounds and/or organic compounds (e.g., aluminum, chromium, carbon, copper, iron, FeSi, potassium, K$_2$SiO$_3$, manganese, molybdenum, NaF, phosphorous, sulfur, silicon, SiO$_2$, strontium, SrCO$_3$, titanium, vanadium, mica, cellulose compounds, etc.). In some non-limiting embodiments, the core 110 optionally includes a binder (e.g., organic binder, etc.). Generally, the nickel content of the core 110 represents the largest weight percent component of the core 110.

In some non-limiting embodiments, the electrode 102 further includes a flux coating 113 on the outer surface of the sheath 112. The flux coating 113 is formulated such that when exposed to high temperatures (such as during an arc welding process), shielding gasses 116 are formed and locally protect the weld pool from contamination with gasses and materials in the atmosphere. In some embodiments, the flux coating 113 is dip coated onto the electrode 102. That is, the material of the flux coating 113 may be mixed with a volatile liquid (for example and without limitation, isopropyl alcohol) to form a colloidal suspension; the electrode 102 may be dipped into the colloidal suspension and then allowed to dry, resulting in a flux coating 113 on the outer surface of the sheath 112. Typically, the drying is conducted in an oven to bake the coating until dry. During the baking process, polymerization cross-linking can occur in the flux coating. The flux coating can be formed of many different material (e.g., AlF$_3$, Al$_2$O$_3$, C, CaCO$_3$, CaF$_2$, chromium, iron, FeCr, Fe$_2$O$_3$, LiF, MgF$_2$, MnO, Na$_3$AlF$_6$, nickel, silicon, SiO$_2$, mica, etc.). In some embodiments, the flux coating 113 optionally includes nickel. The flux coating 113 (when used) generally constitutes about 0.1-20 wt. % of the total weight of the electrode 102, and typically about 0.5-14 wt. % of the total weight of the electrode 102.

In some non-limiting embodiments, the electrode 102 is configured to create a final weld metal with a nickel content greater than 35 wt. %. In one non-limiting embodiment, the electrode 102 is configured to create a final weld metal with a nickel content greater than 45 wt. %, and typically about 45-60 wt. % (and all values and ranges therebetween).

Figure 2:
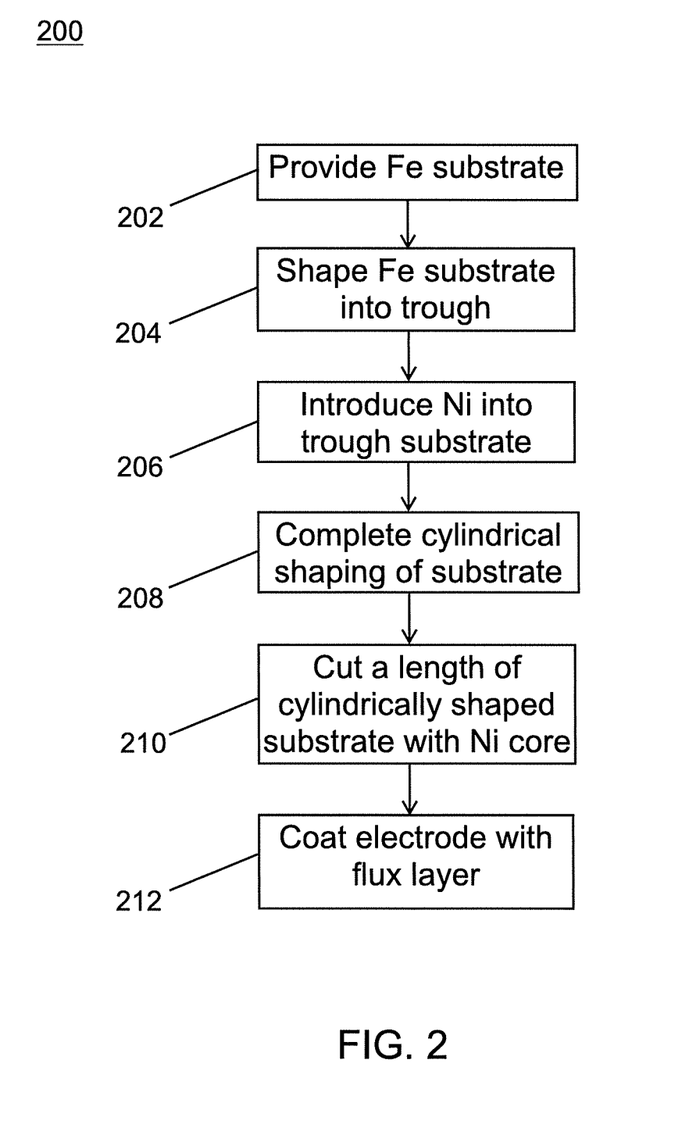
FIG. 2 illustrates a non-limiting block process for creating an electrode containing nickel in accordance with the present disclosure.

In accordance with another non-limiting aspect of the present disclosure and with reference to FIG. 2, a method 200 for creating a nickel-containing electrode is provided. At 202, an iron-containing substrate or strip is provided. In some embodiments, the iron-containing substrate is a continuous strip of material. At 204, the iron-containing substrate is shaped into a trough configured to receive the core materials. At 206, powdered nickel and optionally one or more other metals, binders, and/or flux agents are introduced to the trough such that when the substantially cylindrical shape of the sheath is completed at 208, the powered nickel and optionally one or more other metals, binders, and/or flux agents partially or fully form the core 110 of the electrode 102. The core 110 generally has a nickel content of greater than 35 wt. % of the core 110. Prior to the completion of the formation of the substantially cylindrical shape of the sheath 208, additional material can be added along with the nickel powder in the trough. At 210, a length of the cylindrically-shaped substrate with a nickel core is cut to form a stick electrode. The length of the stick electrode is non-limiting, but is generally no more than 40 in. In one non-limiting embodiment, the length of the stick electrode is 4-40 in. (and all values and ranges therebetween), and typically about 6-24 in. Optionally, at 212 the electrode is coated with a flux coating 113. In some non-limiting embodiments, the electrode 102 is dipped into a flux mixture to create the flux coating 113. Generally, about 0.1-2 in. of one end of the electrode is not coated with the optional flux coating so that the bare surface of the sheath is exposed for purposes of providing the desired electrical contact with the power source 108 during the weld bead formation process.

The present disclosure is further illustrated in the following non-limiting working examples. It is to be understood that these examples are intended to be illustrative only and that the disclosure is not intended to be limited to the materials, conditions, process parameters and the like recited herein.

Example 1

A nickel-containing stick electrode was created with the following compositions. A strip of iron steel (e.g., 1003 AiSi low carbon steel) that was 0.165 inches thick and 0.875 inches wide was rolled into a trough filled with a nickel-containing core material. The strip was thereafter further continuously rolled to from a sheath encapsulating the core material. The final outer sheath diameter was about 0.25 inches. The outer surface of the sheath was optionally coated with a flux containing coating, which coating thickness was less than 0.2 inches.

The composition of the core material was as follows:

| Core Material | wt. % | | |
|---|---|---|---|
| Graphite/Carbon | 0-5 | 0.2-2 | 0.5-0.8 |
| Aluminum | 0-10 | 1-5 | 1.3-1.9 |
| Sodium Fluoride | 0-6 | 0.2-4 | 0.6-1.5 |
| Potassium Silicate | 0-2 | 0.1-1 | 0.1-0.5 |
| Resin Powder | 0-5 | 0.1-3 | 0.6-1.6 |
| Silicon Metal | 0-10 | 1.5-7 | 2.2-4 |
| Strontium Carbonate | 0-18 | 2-10 | 3.9-7 |
| Mica | 0-10 | 1-6 | 2.1-4 |
| Nickel Powder | 35-100 | 62-94.6 | 78.7-88.7 |

The composition of the sheath was as follows:

| Strip Material | wt. % | |
|---|---|---|
| Carbon | 0-0.1 | 0.02-0.05 |
| Manganese | 0-0.5 | 0.2-0.26 |

-continued

| Strip Material | wt. % | |
| --- | --- | --- |
| Phosphorous | 0-0.01 | 0.005-0.009 |
| Sulfur | 0-0.02 | 0.009-0.013 |
| Silicon | 0-0.03 | 0.011-0.017 |
| Chromium | 0-0.08 | 0.01-0.03 |
| Nickel | 0-0.06 | 0.01-0.03 |
| Copper | 0-0.1 | 0.02-0.04 |
| Molybdenum | 0-0.005 | 0-0.002 |
| $N_2$ | 0-0.008 | 0.001-0.005 |
| Antimony | 0-0.008 | 0-0.004 |
| Niobium | 0-0.008 | 0-0.004 |
| Aluminum | 0-0.07 | 0.01-0.05 |
| Titanium | 0-0.005 | 0-0.003 |
| Vanadium | 0-0.005 | 0-0.003 |
| Iron | Balance | Balance |

The electrode of Example 1 formed a weld metal having a nickel composition of about 53.27 wt. % during the welding of a ferrous material that had an iron content of greater than 80 wt. %, and typically greater than 88 wt. %, and which ferrous material had a nickel content of less than 5 wt. % and typically less than 2 wt. % (e.g., cast iron, etc.).

Example 2

A nickel-containing stick electrode was created with the following compositions. A strip of iron steel (e.g., 1003 AiSi low carbon steel) that was 0.165 in. thick and 0.875 in. wide was rolled into a trough filled with a nickel-containing core material. The strip was continuously rolled to form a sheath encapsulating the core material. The final outer sheath diameter was about 0.25 in. The outer surface of the sheath was optionally coated with a flux containing coating, which coating thickness was less than 0.2 in.

The composition of the core materials was as follows:

| Core Material | wt. % | | |
| --- | --- | --- | --- |
| Ferro Silicon | 0-2 | 1-2 | 1.2-1.4 |
| Sodium Fluoride | 0-3 | 2.2-3 | 2.4-2.7 |
| Ethyl Cellulose | 0-1 | 0.3-0.7 | 0.4-0.55 |
| Phenolic resin | 0-1 | 0.3-0.7 | 0.4-0.55 |
| Graphite/Carbon | 0-4 | 2.5-3.5 | 2.9-3.2 |
| Potassium Silicate | 0-1 | 0.55-0.8 | 0.6-0.75 |
| Strontium Carbonate | 0-14 | 9-12 | 9.5-11 |
| Silica Sand | 0-4 | 3-4 | 3.1-3.5 |
| Nickel Powder | 70-100 | 72-78 | 74-77 |
| Aluminum | 0-3.6 | 3.1-3.6 | 3.2-3.5 |

The composition of the sheath was as follows:

| Strip Material | wt. % | |
| --- | --- | --- |
| Carbon | 0-0.1 | 0.02-0.05 |
| Manganese | 0-0.5 | 0.2-0.26 |
| Phosphorous | 0-0.01 | 0.005-0.009 |
| Sulfur | 0-0.02 | 0.009-0.013 |
| Silicon | 0-0.03 | 0.011-0.017 |
| Chromium | 0-0.08 | 0.01-0.03 |
| Nickel | 0-0.06 | 0.01-0.03 |
| Copper | 0-0.1 | 0.02-0.04 |
| Molybdenum | 0-0.005 | 0-0.002 |
| $N_2$ | 0-0.008 | 0.001-0.005 |
| Antimony | 0-0.008 | 0-0.004 |
| Niobium | 0-0.008 | 0-0.004 |
| Aluminum | 0-0.07 | 0.01-0.05 |
| Titanium | 0-0.005 | 0-0.003 |
| Vanadium | 0-0.005 | 0-0.003 |
| Iron | Balance | Balance |

The electrode of Example 2 formed a weld metal having a nickel composition of about 47.87 wt. % during the welding of a ferrous material that had an iron content of greater than 80 wt. %, and typically greater than 88 wt. %, and which ferrous material had a nickel content of less than 5 wt. % and typically less than 2 wt. % (e.g., cast iron, etc.).

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

To aid the Patent Office and any readers of this application and any resulting patent in interpreting the claims appended hereto, Applicant does not intend any of the appended claims or claim elements to invoke 35 U.S.C. 112(f) unless the words "means for" or "step for" are explicitly used in the particular claim.

What is claimed:

1. A metal-cored electrode for welding to form a weld bead on a ferrous material that is formed of at least 80 wt. % iron, and which the weld bead includes at least 35 wt. % nickel said metal-cored electrode comprises a metal sheath surrounding a core; said metal sheath constitutes about 12-60 wt. % of a total weight of said metal-cored electrode; said metal sheath formed of greater than 50 wt. % iron; said core is at least 80% encircled by said metal sheath; said core constitutes 40-70 wt. % of a total weight of said metal-cored electrode; and wherein said metal sheath includes by weight percent of said metal sheath:

| Carbon | 0.02-0.05 |
| --- | --- |
| Manganese | 0.2-0.26 |
| Phosphorous | 0.005-0.009 |
| Sulfur | 0.009-0.013 |
| Silicon | 0.011-0.017 |
| Chromium | 0.01-0.03 |
| Nickel | 0.01-0.03 |
| Copper | 0.02-0.04 |
| Molybdenum | 0-0.002 |
| $N_2$ | 0.001-0.005 |
| Antimony | 0-0.004 |
| Niobium | 0-0.004 |
| Aluminum | 0.01-0.05 |
| Titanium | 0-0.003 |
| Vanadium | 0-0.003 |
| Iron | Balance. | and
wherein said core includes by weight percent of said core:

| | |
|---|---|
| Graphite/Carbon | 0.2-2 |
| Aluminum | 1-5 |
| Sodium Fluoride | 0.2-4 |
| Potassium Silicate | 0.1-1 |
| Resin Powder | 0.1-3 |
| Silicon Metal | 1.5-7 |
| Strontium Carbonate | 2-10 |
| Mica | 1-6 |
| Nickel | 62-94.6. |

2. The metal-cored electrode as defined in claim 1, wherein said metal sheath includes at least 75 wt. % iron; an iron content of said metal sheath constitutes at least 80 wt. % of a total iron content of said metal-cored electrode.

3. The metal-cored electrode as defined in claim 1, wherein said core includes no more than 5 wt. % iron an iron content of said core constitutes no more than 10 wt. % of a total iron content of said metal-cored electrode.

4. The metal-cored electrode as defined in claim 2, wherein said core includes no more than 5 wt. % iron an iron content of said core constitutes no more than 10 wt. % of a total iron content of said metal-cored electrode.

5. The metal-cored electrode as defined in claim 1, further including a coating on an outer surface of said metal sheath; said coating constitutes about 0.5-18 wt. % of said total weight of said metal-cored electrode; said coating having a coating thickness of at least 0.01 in.; said coating covering at least 80% of an outer surface of said metal sheath; an iron content in said coating is less than 10 wt. % of a total iron content of said metal-cored electrode, a nickel content in said coating is less than 10 wt. % of a total nickel content of said metal-cored electrode.

6. The metal-cored electrode as defined in claim 4, further including a coating on an outer surface of said metal sheath; said coating constitutes about 0.5-18 wt. % of said total weight of said metal-cored electrode; said coating having a coating thickness of at least 0.01 in.; said coating covering at least 80% of an outer surface of said metal sheath; an iron content in said coating is less than 10 wt. % of a total iron content of said metal-cored electrode, a nickel content in said coating is less than 10 wt. % of a total nickel content of said metal-cored electrode.

7. A metal-cored electrode for welding to form a weld bead on a ferrous material that is formed of at least 80 wt. % iron, and which the weld bead includes at least 35 wt. % nickel; said metal-cored electrode comprises a metal sheath surrounding a core; said metal sheath constitutes about 12-60 wt. % of a total weight of said metal-cored electrode; said metal sheath formed of greater than 50 wt. % iron; said core is at least 80% encircled by said metal sheath; said core constitutes 40-70 wt. % of a total weight of said metal-cored electrode; said metal sheath including a coating on an outer surface of said metal sheath; said coating constitutes about 0.5-18 wt. % of said total weight of said metal-cored electrode; said coating having a coating thickness of at least 0.01 in.; said coating covering at least 80% of an outer surface of said metal sheath; an iron content in said coating is less than 10 wt. % of a total iron content of said metal-cored electrode; a nickel content in said coating is less than 10 wt. % of a total nickel content of said metal-cored electrode; and wherein said metal sheath includes by weight percent of said metal sheath:

| | |
|---|---|
| Carbon | 0.02-0.05 |
| Manganese | 0.2-0.26 |
| Phosphorous | 0.005-0.009 |
| Sulfur | 0.009-0.013 |
| Silicon | 0.011-0.017 |
| Chromium | 0.01-0.03 |
| Nickel | 0.01-0.03 |
| Copper | 0.02-0.04 |
| Molybdenum | 0-0.002 |
| $N_2$ | 0.001-0.005 |
| Antimony | 0-0.004 |
| Niobium | 0-0.004 |
| Aluminum | 0.01-0.05 |
| Titanium | 0-0.003 |
| Vanadium | 0-0.003 |
| Iron | Balance. | and
wherein said core includes by weight percent of said core:

| | |
|---|---|
| Graphite/Carbon | 0.2-2 |
| Aluminum | 1-5 |
| Sodium Fluoride | 0.2-4 |
| Potassium Silicate | 0.1-1 |
| Resin Powder | 0.1-3 |
| Silicon Metal | 1.5-7 |
| Strontium Carbonate | 2-10 |
| Mica | 1-6 |
| Nickel | 62-94.6. |

8. A method for forming a weld bead comprising:
providing a metal-cored electrode; said metal-cored electrode comprising a metal sheath surrounding a core; said metal sheath constitutes about 12-60 wt. % of a total weight of said metal-cored electrode; said metal sheath formed of greater than 50 wt. % iron; said core is at least 80% encircled by said metal sheath; said core constitutes 40-70 wt. % of a total weight of said metal-cored electrode; and wherein said metal sheath includes by weight percent of said metal sheath:

| | |
|---|---|
| Carbon | 0.02-0.05 |
| Manganese | 0.2-0.26 |
| Phosphorous | 0.005-0.009 |
| Sulfur | 0.009-0.013 |
| Silicon | 0.011-0.017 |
| Chromium | 0.01-0.03 |
| Nickel | 0.01-0.03 |
| Copper | 0.02-0.04 |
| Molybdenum | 0-0.002 |
| $N_2$ | 0.001-0.005 |
| Antimony | 0-0.004 |
| Niobium | 0-0.004 |
| Aluminum | 0.01-0.05 |
| Titanium | 0-0.003 |
| Vanadium | 0-0.003 |
| Iron | Balance; | and
wherein said core includes by weight percent of said core:

| | |
|---|---|
| Graphite/Carbon | 0.2-2 |
| Aluminum | 1-5 |
| Sodium Fluoride | 0.2-4 |
| Potassium Silicate | 0.1-1 |
| Resin Powder | 0.1-3 |
| Silicon Metal | 1.5-7 |
| Strontium Carbonate | 2-10 |
| Mica | 1-6 |
| Nickel Powder | 62-94.6. | providing a workpiece, said workpiece formed of at least 80 wt. % iron; and, heating said metal-cored electrode to at least partially melt said metal-cored electrode and to form a weld bead on said workpiece said weld bead including at least 35 wt. % nickel.

9. The method as defined in claim 8, wherein said metal sheath includes at least 75 wt. % iron; an iron content of said metal sheath constitutes at least 80 wt. % of a total iron content of said metal-cored electrode.

10. The method as defined in claim 8, wherein said core includes no more than 5 wt. % iron an iron content of said core constitutes no more than 10 wt. % of a total iron content of said metal-cored electrode.

11. The method as defined in claim 9, wherein said core includes no more than 5 wt. % iron an iron content of said core constitutes no more than 10 wt. % of a total iron content of said metal-cored electrode.

12. The method as defined in claim 8, further including a coating on an outer surface of said metal sheath; said coating constitutes about 0.5-18 wt. % of said total weight of said metal-cored electrode; said coating having a coating thickness of at least 0.01 in.; said coating covering at least 80% of an outer surface of said metal sheath; an iron content in said coating is less than 10 wt. % of a total iron content of said metal-cored electrode, a nickel content in said coating is less than 10 wt. % of a total nickel content of said metal-cored electrode.

13. The method as defined in claim 11, further including a coating on an outer surface of said metal sheath; said coating constitutes about 0.5-18 wt. % of said total weight of said metal-cored electrode; said coating having a coating thickness of at least 0.01 in.; said coating covering at least 80% of an outer surface of said metal sheath; an iron content in said coating is less than 10 wt. % of a total iron content of said metal-cored electrode, a nickel content in said coating is less than 10 wt. % of a total nickel content of said metal-cored electrode.

\* \* \* \* \*